US012656804B2

(12) United States Patent
Yoshikawa

(10) Patent No.: US 12,656,804 B2
(45) Date of Patent: Jun. 16, 2026

(54) STABILIZED VOLTAGE GENERATION CIRCUIT AND SEMICONDUCTOR DEVICE

(71) Applicant: ROHM CO., LTD., Kyoto (JP)

(72) Inventor: Hiroshi Yoshikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 148 days.

(21) Appl. No.: 18/520,785

(22) Filed: Nov. 28, 2023

(65) Prior Publication Data

US 2024/0094758 A1 Mar. 21, 2024

Related U.S. Application Data

(63) Continuation of application No. PCT/JP2022/016235, filed on Mar. 30, 2022.

(30) Foreign Application Priority Data

Jun. 2, 2021 (JP) ................................ 2021-092835

(51) Int. Cl.
*G05F 3/26* (2006.01)

(52) U.S. Cl.
CPC .................................... *G05F 3/262* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069
See application file for complete search history.

(56) References Cited

U.S. PATENT DOCUMENTS

2010/0164461 A1 7/2010 Hirose et al.
2012/0025801 A1* 2/2012 Hirose .................... G05F 3/242
323/313

(Continued)

FOREIGN PATENT DOCUMENTS

CN 102236359 A 11/2011
CN 103529897 A 1/2014
CN 103677054 A 3/2014

(Continued)

OTHER PUBLICATIONS

International Search Report and Written Opinion in International Appln. No. PCT/JP2022/016235, mailed on Jun. 14, 2022, 16 pages (with machine translation).

(Continued)

*Primary Examiner* — Bryan R Perez
(74) *Attorney, Agent, or Firm* — Fish & Richardson P.C.

(57) ABSTRACT

The stabilized voltage generation circuit includes: a first voltage generation circuit configured to generate a first voltage with positive temperature characteristics; and a second voltage generation circuit including a first MOSFET having a gate of a first conductivity type and a second MOSFET having a gate of a second conductivity type different from the first conductivity type and configured to generate a second voltage with negative temperature characteristics based on the difference in gate threshold voltage between the first and second MOSFETs. The output voltage is generated based on the sum voltage of the first and second voltages.

12 Claims, 6 Drawing Sheets

(56) References Cited

U.S. PATENT DOCUMENTS

| | | | | |
|---|---|---|---|---|
| 2014/0070777 | A1 | 3/2014 | Wu et al. | |
| 2021/0294366 | A1* | 9/2021 | Watanabe ................. | G05F 3/20 |

FOREIGN PATENT DOCUMENTS

| | | |
|---|---|---|
| JP | S50-082546 | 7/1975 |
| JP | S50-161663 | 12/1975 |
| JP | S60-151729 | 8/1985 |
| JP | H05-014073 | 1/1993 |
| JP | 2004-239734 | 8/2004 |
| JP | 2005-321931 | 11/2005 |
| JP | 2008-048298 | 2/2008 |
| JP | 2008-251055 | 10/2008 |
| WO | WO 2009/014042 | 1/2009 |

OTHER PUBLICATIONS

Xie et al., "Design of a Low-power Voltage Reference Based on Subthreshold MOSFETs," International Conference on Electronic Computer Technology, Feb. 20-22, 2009, pp. 620-623.
JP OA—Japanese Patent Office, Office Action in Japanese Appln. No. 2023-525637, dated Mar. 17, 2026, 10 pages (with English translation).
CN OA—The State Intellectual Property Office of People's Republic of China, Office Action in Chinese Appln. No. 202280034969.3, dated Apr. 22, 2026, 25 pages (with English Translation).

* cited by examiner

STABILIZED VOLTAGE GENERATION CIRCUIT AND SEMICONDUCTOR DEVICE

CROSS-REFERENCE TO RELATED APPLICATIONS

This nonprovisional application is a continuation application of International Patent Application No. PCT/JP2022/016235 filed on Mar. 30, 2022, which claims priority Japanese Patent Application No. 2021-092835 filed on Jun. 2, 2021, the entire contents of which are hereby incorporated by reference.

TECHNICAL FIELD

The present disclosure relates to stabilized voltage generation circuits and semiconductor devices.

BACKGROUND ART

A stabilized voltage generation circuit generates and outputs a voltage stabilized at a desired direct-current voltage value. As one type of stabilized voltage generation circuit, band-gap references are widely known.

CITATION LIST

Patent Literature

Non-Patent Document 1: JP-A-2008-251055

DESCRIPTION OF EMBODIMENTS

Examples of implementing the present disclosure will be specifically described below with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the first voltage generation circuit described later and identified by the reference sign "110" (see FIG. 5) is sometimes referred to as "first voltage generation circuit 110" and other times abbreviated to "voltage generation circuit 110" or "circuit 110", all referring to the same entity.

First, some of the terms used to describe embodiments of the present disclosure will be defined. "Line" denotes a wiring across or to which an electrical signal is transmitted or applied. "Ground" denotes a reference conductor at a reference potential of 0 V (zero volts), or to a potential of 0 V itself. A reference conductor is formed of an electrically conductive material such as metal. A potential of 0 V is occasionally referred to as a ground potential. In embodiments of the present disclosure, any voltage mentioned with no particular reference mentioned is a potential relative to the ground.

Unless otherwise stated, any MOSFET mentioned herein can be understood to be an enhancement MOSFET. "MOSFET" is an abbreviation of "metal-oxide-semiconductor field-effect transistor". Unless otherwise stated, for any MOSFET mentioned herein, the back gate is assumed to be connected to the source. For any transistor configured as a MOSFET, the gate-source voltage is the potential at the gate relative to the potential at the source.

Wherever "connection" is discussed among a plurality of parts constituting a circuit, as among any circuit elements, wirings, nodes, and the like, the term is to be understood to denote "electrical connection."

Figure 1:
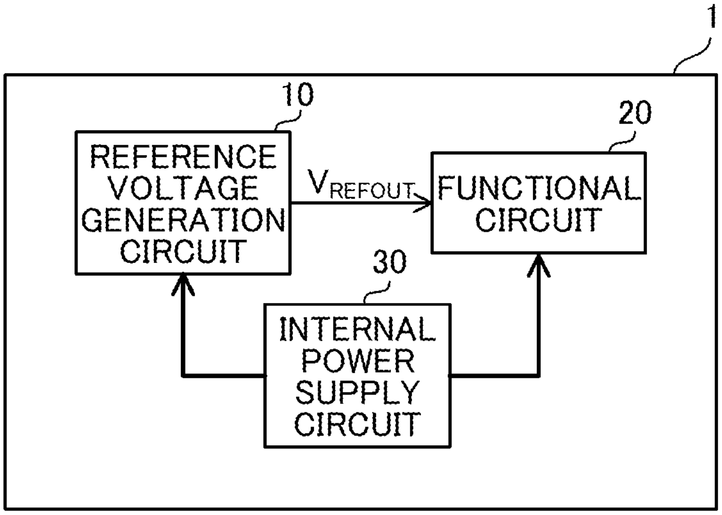
FIG. 1 is an overall configuration diagram of a semiconductor device according to an embodiment of the present disclosure.
Figure 2:
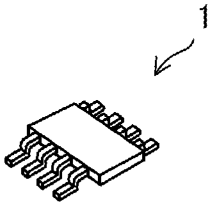
FIG. 2 is an exterior perspective view of the semiconductor device according to the embodiment of the present disclosure.

FIG. 1 shows an outline of the overall configuration of a semiconductor device 1 according to an embodiment of the present disclosure. FIG. 2 is an exterior perspective view of the semiconductor device 1. The semiconductor device 1 is an electronic component that includes a semiconductor chip having a semiconductor integrated circuit formed on a semiconductor substrate, a package (case) housing the semiconductor chip, and a plurality of external terminals exposed out of the package to outside the semiconductor device 1. Sealing the semiconductor chip in the package (case) formed of resin yields the semiconductor device 1. The number of external terminals, and the type of package, of the semiconductor device 1 shown in FIG. 2 are merely illustrative, and can be designed as desired.

The semiconductor device 1 includes, as circuits included in the semiconductor integrated circuit constituting the semiconductor device 1, a reference voltage generation circuit (stabilized voltage generation circuit) 10, a functional circuit 20, and an internal power supply circuit 30. The reference voltage generation circuit 10 generates and outputs a reference voltage $V_{REFOUT}$ as a stabilized voltage with a predetermined direct-current voltage value. The functional circuit 20 is a circuit that performs predetermined functional operation. The functional operation is operation corresponding to a function that the semiconductor device 1 is expected to perform. The functional circuit 20 performs the functional operation by using the reference voltage $V_{REFOUT}$ generated in the reference voltage generation circuit 10. The internal power supply circuit 30 generates an internal supply voltage with a predetermined direct-current voltage value based on a direct-current input voltage supplied to the semiconductor device 1 from an unillustrated external power supply. The reference voltage generation circuit 10 and the functional circuit 20 operate based on the internal supply voltage.

Figure 3:
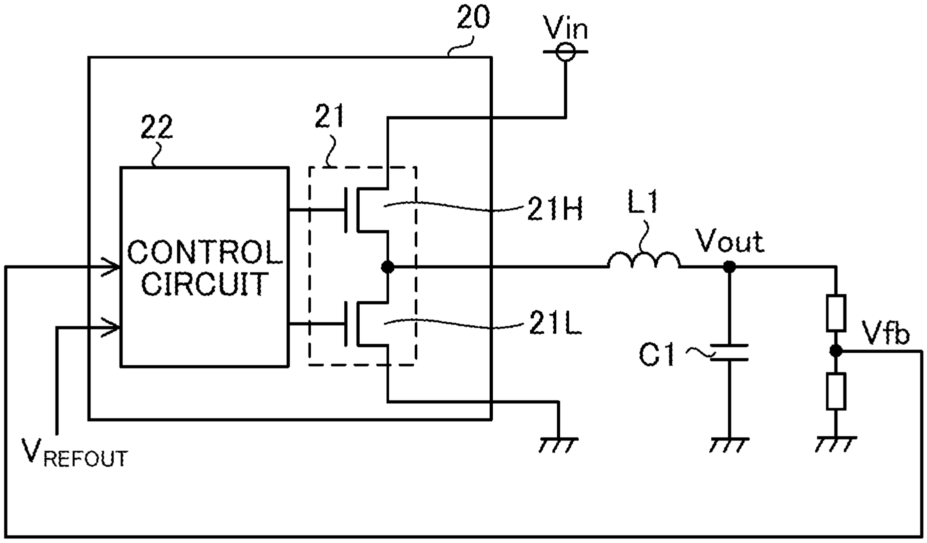
FIG. 3 is a diagram showing an example of the configuration of a functional circuit according to the embodiment of the present disclosure.

FIG. 3 shows a configuration example of the functional circuit 20 for a case where the semiconductor device 1 is a device (what is called a power supply IC) for building a switching power supply device. The switching power supply device shown in FIG. 3 is a bucking (stepping-down) DC/DC converter that generates from a predetermined input voltage Vin a predetermined output voltage Vout stabilized at a target voltage. The input voltage Vin and the output voltage Vout each have a positive direct-current voltage value (where Vin>Vout). The functional circuit 20 in FIG. 3 includes an output stage circuit 21 and a control circuit 22. The output stage circuit 21 is a half-bridge circuit composed of a high-side transistor 21H and a low-side transistor 21L connected in series. In the configuration example in FIG. 3, the transistors 21H and 21L are configured as N-channel MOSFETs (metal-oxide-semiconductor field-effect transistors). The output stage circuit 21 is fed with the direct-current input voltage Vin. The control circuit 22 controls the gate potentials of the transistors 21H and 21L such that the transistors 21H and 21L turns on and off alternately. As a result, a voltage with a rectangular waveform appears at the connection node between the transistors 21H and 21L. The voltage with the rectangular waveform is rectified and smoothed by a rectifying-smoothing circuit composed of a coil L1 and a capacitor C1, and this produces the output voltage Vout. A division voltage of the output voltage Vout is fed as a feedback voltage Vfb to the control circuit 22. The control circuit 22 controls the states (on or off state) of the transistors 21H and 21L such that the feedback voltage Vfb is equal to the reference voltage $V_{REFOUT}$ In this way, the output voltage Vout is stabilized at the predetermined target voltage. In the functional circuit 20 in FIG. 3, the operation, performed by the control circuit 22, of turning the transistors 21H and 21L on and off alternately is one of the functions that the functional circuit 20 is expected to perform.

While the above description deals with functional operation for a case where the semiconductor device 1 is a device (what is called a power supply IC) for building a switching power supply device, the functional circuit 20 can perform any functional operation. Specifically, for example, the semiconductor device 1 can be a motor driver to be built into a motor driving system, in which case the functional circuit 20 performs functional operation of supplying each coil of a three-phase motor with a terminal voltage with a rectangular waveform. For another example, the semiconductor device 1 can be an LED driver to be built into a lighting system, in which case the functional circuit 20 performs functional operation of supplying the LEDs (light-emitting diodes) provided in the lighting system with a driving current for light emission. In any case, the functional circuit 20 performs the functional operation by using the reference voltage $V_{REFOUT}$.

Stable performance of the functional operation requires a reference voltage $V_{REFOUT}$ that is accurate over the operating temperature range of the semiconductor device 1. It is here assumed that the operating temperature range of the semiconductor device 1 is from −40° C. to 150° C.

Figure 4:
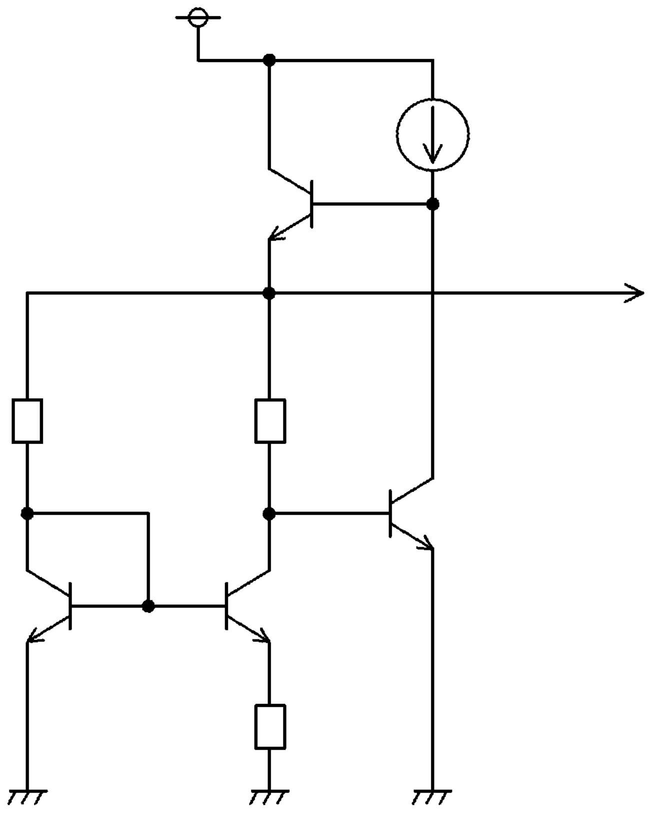
FIG. 4 is a configuration diagram of a band-gap reference.

A method is known whereby a reference voltage is generated with a band-gap reference. FIG. 4 shows an example of the circuit of a band-gap reference. A band-gap reference is a reference voltage source that generates a reference voltage by use of the band-gap voltage of silicon, and is configured with a plurality of bipolar transistors. The band-gap reference in FIG. 4 cancels the temperature characteristics of resistors by exploiting the temperature characteristics of the forward voltage across the PN junction in NPN bipolar transistors. Inconveniently, this method is subject to multiple factors of variation such as variation of the current produced from the forward voltage, variation of the matching among resistors, and variation of the temperature characteristics. As a result, a reference voltage generated with a band-gap reference can deviate from the set voltage by about ±2% over the temperature range from −40° C. to 150° C. Moreover, a band-gap reference requires about several microamperes for the collector currents of bipolar transistors and for other correction currents, and this makes it difficult to achieve energy saving.

Figure 5:
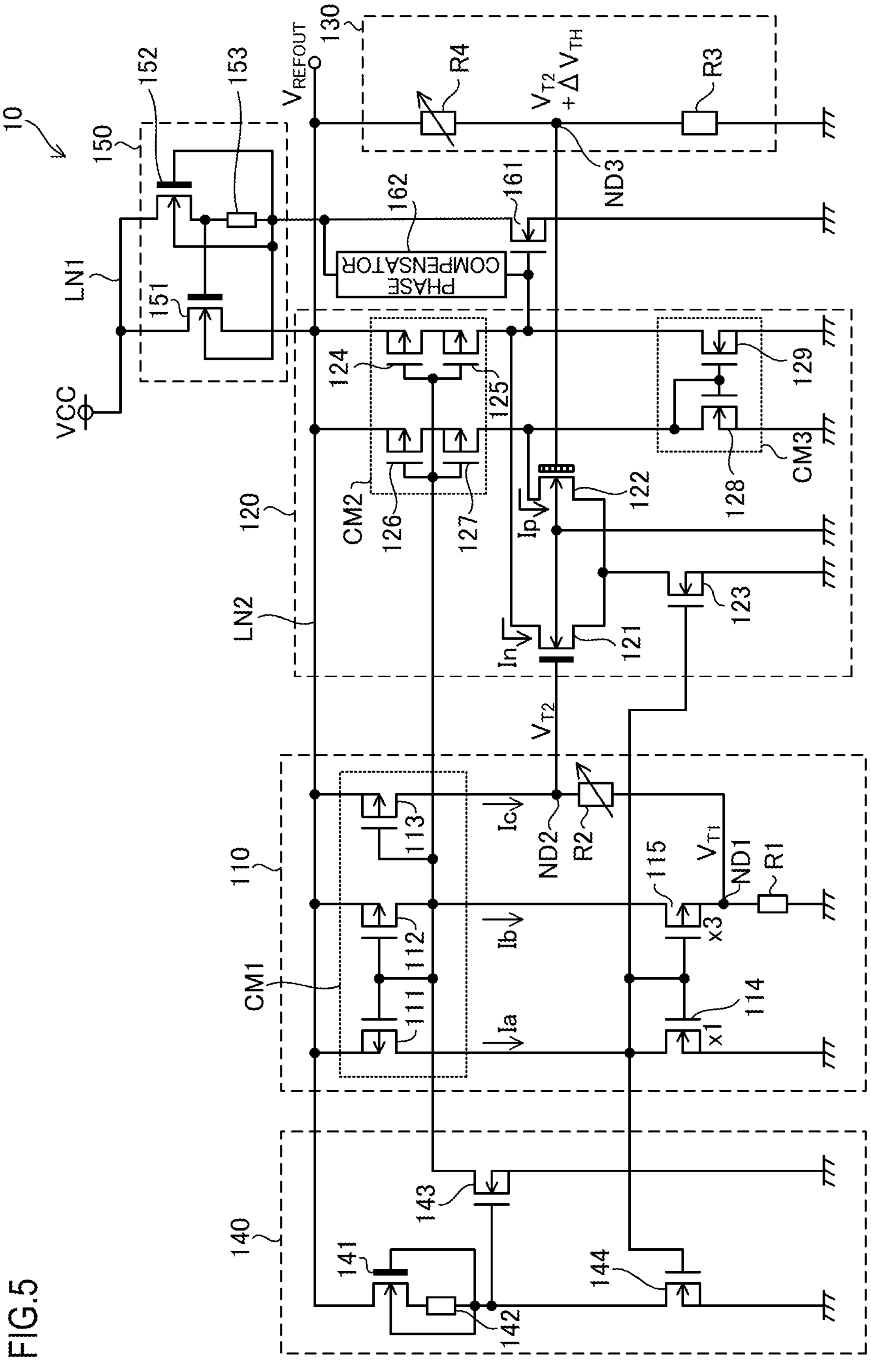
FIG. 5 is a configuration diagram of a reference voltage generation circuit according to the embodiment of the present disclosure.

FIG. 5 shows a configuration example of the reference voltage generation circuit 10. The reference voltage generation circuit 10 generates a reference voltage $V_{REFOUT}$ that is accurately equal to a predetermined set voltage $V_{SET}$ over the operating temperature range of the semiconductor device 1. The set voltage $V_{SET}$ can have any predetermined positive direct-current voltage value, for example 1.3 V.

The reference voltage generation circuit 10 includes a first voltage generation circuit 110, a second voltage generation circuit 120, an output adjustment circuit 130, a starting circuit 140, and a current source circuit 150. The reference voltage generation circuit 10 also includes a transistor 161 and a phase compensator 162. The first voltage generation circuit 110 generates a voltage $V_{T2}$ with positive temperature characteristics (positive temperature coefficient) while the second voltage generation circuit 120 generates a voltage $\Delta V_{TH}$ with negative temperature characteristics (negative temperature coefficient). The sum ($V_{T2}+\Delta V_{TH}$) of those voltages is adjusted by the output adjustment circuit 130 to produce the reference voltage $V_{REFOUT}$. The circuit configuration of FIG. 5 and its operation will now be described in detail.

The first voltage generation circuit 110 includes transistors 111 to 115 and resistors R1 and R2. The transistors 113 to 113 are P-channel MOSFETs and the transistors 114 and 115 are N-channel MOSFETs. The second voltage generation circuit 120 includes transistors 121 to 129. The transistors 124 to 127 are P-channel MOSFETs and transistors 121 to 123, 128, and 129 are N-channel MOSFETs. The output adjustment circuit 130 includes resistors R3 and R4. The starting circuit 140 includes transistors 141, 143, and 144 and a resistor 142. The transistors 141, 143, and 144 are N-channel MOSFETs. The current source circuit 150 includes transistors 151 and 152 and a resistor 153. The transistors 151 and 152 are N-channel MOSFETs. The transistor 161 is an N-channel MOSFET.

Of the transistors in the reference voltage generation circuit 10, the transistors 141, 151, and 152 are depression MOSFETs. The structure and characteristics of the transistors 121 and 122 will be described later. The resistors R2 and R4 are variable resistors, while the resistors R3 and R4 are fixed resistors. That is, the values of the resistors R2 and R4 can be varied individually, and the values of the resistors R3 and R4 are each fixed. The resistors 142 and 153 may also be fixed resistors.

The interconnections among the circuit elements will be described. The drains of the transistors 151 and 152 are connected to a supply voltage line LN1. The gate of the transistor 151, the source of the transistor 152, and one terminal of the resistor 153 are connected together. The other terminal of the resistor 153 is connected to the gate and the back gate of the transistor 152, to the back gate of the transistor 151, and to the drain of the transistor 161. Between the gate and the drain of the transistor 161, the phase compensator 162 (e.g., a phase compensation capacitor) is inserted. The source of the transistor 161 is connected to the ground.

To an output voltage line LN2 are connected the source of the transistor 151, the sources of the transistors 111 to 113, 124, and 126, and the drain of the transistor 141. The source of the transistor 141 is connected to one terminal of the resistor 142. The other terminal of the resistor 142, the gate and the back gate of the transistor 141, the gate of the transistor 143, and the drain of the transistor 144 are connected together. The sources of the transistors 143 and 144 are connected to the ground. To the drain of the transistor 143 are connected the gates of the transistors 111 to 113 and 124 to 127 and the drain of the transistor 112. The gate of the transistor 144 is connected to the gates of the transistors 114, 115, and 123 and to the drains of the transistors 111 and 114.

While the source of the transistor 114 is connected directly to the ground, the source of the transistor 115 is connected via the resistor R1 to the ground. That is, the source of the transistor 115 is connected to one terminal of the resistor R1 at a node ND1, and the other terminal of the resistor R1 is connected to the ground. The drain of the transistor 115 is connected to the drain of the transistor 112. The drain of the transistor 113 is connected to one terminal of the resistor R2 at a node ND2, and the other terminal of the resistor R2 is connected to the node ND1. That is, the resistor R2 is inserted between nodes ND1 and ND2.

The drain of the transistor 124 is connected to the source of the transistor 125. The drain of the transistor 125 is connected to the drain of the transistor 121, to the gate of the transistor 161, and to the drain of the transistor 129. The drain of the transistor 126 is connected to the source of the transistor 127. The drain of the transistor 127 is connected to the drain of the transistor 122, to the drain and the gate of the transistor 128, and to the gate of the transistor 129. The sources of the transistors 128 and 129 are connected to the ground.

While the gate of the transistor 121 is connected to the node ND2, the gate of the transistor 122 is connected to a node ND3. The sources of the transistors 121 and 122 are both connected to the drain of the transistor 123, and the source of the transistor 123 is connected to the ground. The back gates of the transistors 121 and 122 are connected to the ground. The node ND3 is connected via the resistor R3 to the ground, and is also connected via the resistor R4 to the output voltage line LN2. That is, one terminals of the resistors R3 and R4 are connected together at the node ND3, the other terminal of the resistor R3 is connected to the ground, and the other terminal of the resistor R4 is connected to the output voltage line LN2.

The operation and characteristics of the reference voltage generation circuit 10 in FIG. 5 will be described. An internal supply voltage VCC can be applied to the supply voltage line LN1, and with the internal supply voltage VCC applied to the supply voltage line LN1, a reference voltage $V_{REFOUT}$ appears on the output voltage line LN2. The internal supply voltage VCC is a predetermined positive direct-current voltage generated in the internal power supply circuit 30 (see FIG. 1).

The current source circuit 150 supplies a driving current to the circuits in the reference voltage generation circuit 10 in FIG. 5 except the current source circuit 150. The circuits other than the current source circuit 150 operate based on this driving current. As the voltage applied to the supply voltage line LN1 rises from 0 V to the internal supply voltage VCC, the drain-source channels of the transistors 151 and 152 enter a conducting state, so that via the transistor 151 a current is supplied from the supply voltage line LN1 to the output voltage line LN2. As this current passes between the drain and the source of the transistor 141, the gate potential in the resistor 143 rises, so that the drain-source channel of the transistor 143 enters a conducting state. As a result, the gate potentials of the transistors 111 to 113 and 124 to 127 fall, resulting in a state where drain currents can pass through the transistors 111 to 113 and 124 to 127 respectively. As a drain current passes through the transistor 111, the gate potentials of the transistors 144, 114, 115, and 123 rise, so that the voltage generation circuits 110 and 120 enter a state where they can operate. In this way, as the voltage applied to the supply voltage line LN1 rises from 0 V to the internal supply voltage VCC, the starting circuit 140 starts up the voltage generation circuits 110 and 120. Once the drain-source channel of the transistor 144 enters a conducting state, the gate potential of the transistor 143 falls, so that the drain-source channel of the transistor 143 enters a cut-off state.

Unless otherwise stated, the following description of the operation and the characteristics of the reference voltage generation circuit 10 in FIG. 5 assumes a state where, with the internal supply voltage VCC applied to the supply voltage line LN1, the voltage generation circuits 110 and 120 have started up.

The first voltage generation circuit 110 generates and outputs a voltage $V_{T2}$ with positive temperature characteristics. The voltage $V_{T2}$ appears at the node ND2. The voltage $V_{T2}$ is a voltage proportional to absolute temperature. In the embodiment, what is meant simply by "absolute temperature" is absolute temperature with respect to the temperature of the reference voltage generation circuit 10. The temperature of the reference voltage generation circuit 10 can be understood to be practically the same as the temperature of the semiconductor device 1 (more specifically, the internal temperature of the semiconductor device 1 or the temperature of the semiconductor chip in the semiconductor device 1). The absolute temperature will occasionally be referred to as the absolute temperature T. Proportional to the absolute temperature T, the voltage $V_{T2}$ rises as the absolute temperature T rises.

In the first voltage generation circuit 110, the transistors 111 to 113 constitute a current mirror circuit CM1. The transistors 111, 112, and 113 have the same structure. The current mirror circuit CM1 feeds a current Ia to a path across the transistor 114, feeds a current Ib to a path across the transistor 115, and feeds a current Ic to a path across the resistor R2. Here, the currents Ia, Ib, and Ic have an equal current value. The current Ic may have a value that is $k_Y$ times the value of the current Ia, where $k_Y$ is a positive value different from one (e.g., $k_Y$=2). The following description assumes that $k_Y$=1.

Compared with the source area of the transistor 114, the source area of the transistor 115 is larger. It is here assumed that the transistor 115 has a source area that is three times the source area of the transistor 114. Except for the difference in source area, the transistors 114 and 115 have the same structure. Three transistors each equivalent to the transistor 114 may be formed and these three transistors may be connected in parallel to constitute the transistor 115.

The current mirror circuit CM1 so functions that drain currents with an equal current value pass through the transistors 114 and 115, and thus, compared with the current density in the transistor 114, the transistor 115 has a current density that is one-third of that. This difference in current density produces a voltage difference ($V_{GS\_114}-V_{GS\_115}$) between the gate-source voltage $V_{GS\_114}$ of the transistor 114 and the gate-source voltage $V_{GS\_115}$ of the transistor 115. This voltage difference ($V_{GS\_114}-V_{GS\_115}$) is applied across the resistor R1. Accordingly, the voltage $V_{T1}$ at the node ND1 is equal to the voltage difference ($V_{GS\_114}-V_{GS\_115}$). The voltage $V_{T1}$ at the node ND1 fulfills Formula (1) below.

$$V_{T1}=(K_B \cdot T/q)\times\ln(m) \tag{1}$$

In Formula (1), $K_B$ represents the Boltzmann constant, T represents the absolute temperature, q represents the electric charge of an electron, and ln(m) represents the natural logarithm of m. In Formula (1), m represents the ratio of the source area of the transistor 115 to the source area of the transistor 114. While in the embodiment m=3, the value of m can be modified as desired (where m>1).

Figure 6:
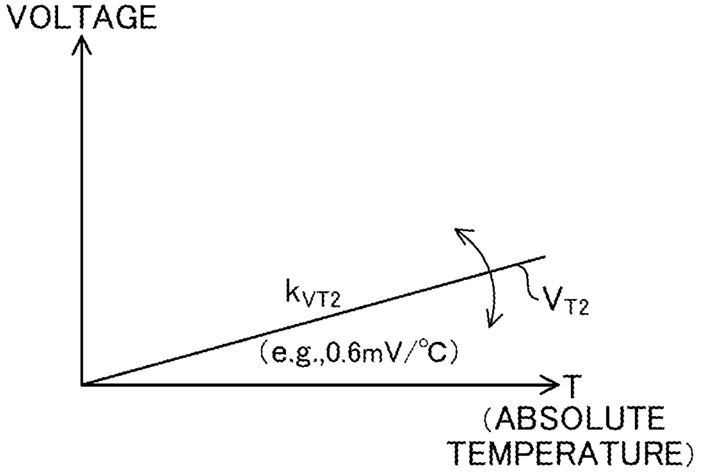
FIG. 6 is a diagram showing the temperature dependence of the voltage generated by a first voltage generation circuit according to the embodiment of the present disclosure.

The first voltage generation circuit 110 outputs, as a voltage $V_{T2}$, the voltage at the node ND2. FIG. 6 shows the relationship of the voltage $V_{T2}$ with the absolute temperature T. The voltage $V_{T2}$ is proportional to the voltage $V_{T1}$ appearing at the node ND1, the constant of proportion depending on the resistance value ratio between the resistors R1 and R2. Accordingly, adjusting the value of resistor R2 permits adjusting the temperature coefficient $k_{VT2}$ of the voltage $V_{T2}$. The temperature coefficient $k_{VT2}$ of the voltage $V_{T2}$ represents the variation of the voltage $V_{T2}$ per rise of one degree in the absolute temperature T, and is proportional to the value ($K_B$/q)xln(m). The temperature coefficient $k_{VT2}$ of the voltage $V_{T2}$ is, for example, +0.6 mV/° C. Here, the resistors R1 and R2 are matched so as to have the same temperature characteristics and thus the resistance value ratio between the resistors R1 and R2 can be regarded as constant against change in temperature. It is also possible to implement the resistor R2 as a fixed resistor and the resistor R1 as a variable resistor, in which case adjusting the value of resistor R1 permits adjusting the temperature coefficient $k_{VT2}$ of the voltage $V_{T2}$. It is possible instead to implement both of the resistors R1 and R2 as variable resistors. A variable resistor in the first voltage generation circuit 110 functions as one for adjusting the temperature coefficient. It is here assumed that, of the resistors R1 and R2, only the resistor R2 is a variable resistor.

Moreover, in the first voltage generation circuit 110, the transistors 114 and 115 operate in a subthreshold region. Specifically, the gate-source voltage $V_{GS\_114}$ of the transistor 114 is lower than the gate threshold voltage of the transistor 114, and subthreshold conduction permits the current Ia to pass between the drain and the source of the transistor 114; likewise, the gate-source voltage $V_{GS\_115}$ of the transistor 115 is lower than the gate threshold voltage of the transistor 115, and subthreshold conduction permits the current Ib to pass between the drain and the source of the transistor 115. Such operation in the subthreshold region can be achieved by appropriately setting the set voltage $V_{SET}$ as the target of the reference voltage $V_{REFOUT}$, the gate lengths and gate widths of the transistors in the first voltage generation circuit 110, etc. For example, the current Ia is set to about 10 nA (nanoamperes) at normal temperature (25° C.) (the same applies to the currents Ib and Ic).

The subthreshold region is also called the weak-inversion region. The gate threshold voltage is the gate-source voltage at the boundary between the strong-inversion region and the weak-inversion region. That is, for example, for any N-channel MOSFET of interest, if the gate potential of the MOSFET is higher than the voltage that is the sum of the source potential of the MOSFET and the gate threshold voltage, the MOSFET operates in the strong-inversion region, and otherwise it operates in the weak-inversion region.

The voltage $V_{T2}$ appearing at the node ND2 is fed to the second voltage generation circuit 120. Specifically, the voltage $V_{T2}$ is fed to the gate of the transistor 121. The transistors 121 and 122 are N-channel MOSFETs but differ in the conductivity type of their respective gates. Specifically, the gate of the transistor 121 is formed of n-type polysilicon (n-type semiconductor) obtained by doping polysilicon with phosphorus or arsenic. By contrast, the gate of the transistor 122 is formed of p-type polysilicon (p-type semiconductor) obtained by doping polysilicon with boron or aluminum. Except for the difference in gate conductivity type, the transistors 121 and 122 have the same structure. Except for the doping process for doping the gate with a dopant aimed at producing the just-mentioned difference, the transistors 121 and 122 are formed by the same production process.

The difference in gate conductivity type between the transistors 121 and 122 results in a difference between the work function at the gate of the transistor 121 and the work function at the gate of the transistor 122, and this produces a difference between the gate threshold voltage of the transistor 121 and the gate threshold voltage of the transistor 122. In the second voltage generation circuit 120, a voltage $\Delta V_{TH}$ corresponding to the difference between the gate threshold voltage of the transistor 121 and the gate threshold voltage of the transistor 122 appears. In other words, a voltage corresponding to the difference between the work function at the gate of the transistor 121 and the work function at the gate of the transistor 122 appears as the voltage $\Delta V_{TH}$.

Furthermore, the transistor 121 is configured as a depression MOSFET. Accordingly, the gate threshold voltage of the transistor 121 has a negative voltage value. Ascribable to the difference in gate conductivity type mentioned above, the gate threshold voltage of the transistor 122 is higher than the gate threshold voltage of the transistor 121 by about 1.0 V at normal temperature (25° C.). For example, if the gate threshold voltage of the transistor 121 is −0.4 V, the gate threshold voltage of the transistor 122 is about 0.6 V. Here, 0.6−(−0.4)=1.0 and hence a voltage $\Delta V_{TH}$ of about 1.0 V appears.

In the second voltage generation circuit 120, the transistors 124 to 127 constitute a current mirror circuit CM2, and the transistors 128 and 129 constitute a current mirror circuit CM3. The transistors 124 to 127 have the same structure, and the current mirror circuit CM2 operates such that the transistors 125 and 127 outputs currents of an equal magnitude from their respective drains. The transistors 128 and 129 have the same structure, and the current mirror circuit CM3 operates such that the drain currents through the transistors 128 and 129 are equal in magnitude. Thus, let the drain current through the transistor 121 be In and let the drain current through the transistor 122 be Ip, then the currents In and Ip have an equal magnitude. In this way, the current mirror circuit CM2 feeds the current In to a path across the transistor 121, and feeds the current Ip, with a magnitude equal to the current In, to a path across the transistor 122.

The transistor 123 operates such that a predetermined constant current passes from the node at which the sources of the transistors 121 and 122 are connected together to the ground. This constant current equals the sum of the drain current through the transistor 121 (i.e., the current In) and the drain current through the transistor 122 (i.e., the current Ip).

In the second voltage generation circuit 120 so configured, as described above, based on the difference between the gate threshold voltage of the transistor 121 and the gate threshold voltage of the transistor 122 (in other words, based on the difference between the work function at the gate of the transistor 121 and the work function at the gate of the transistor 122), the gate potential of the transistor 122 is higher than the gate potential of the transistor 121 by the voltage $\Delta V_{TH}$. As a result, the voltage at the node ND3 is the sum voltage ($V_{T2}+\Delta V_{TH}$) of the voltages $V_{T2}$ and $\Delta V_{TH}$.

Figure 7:
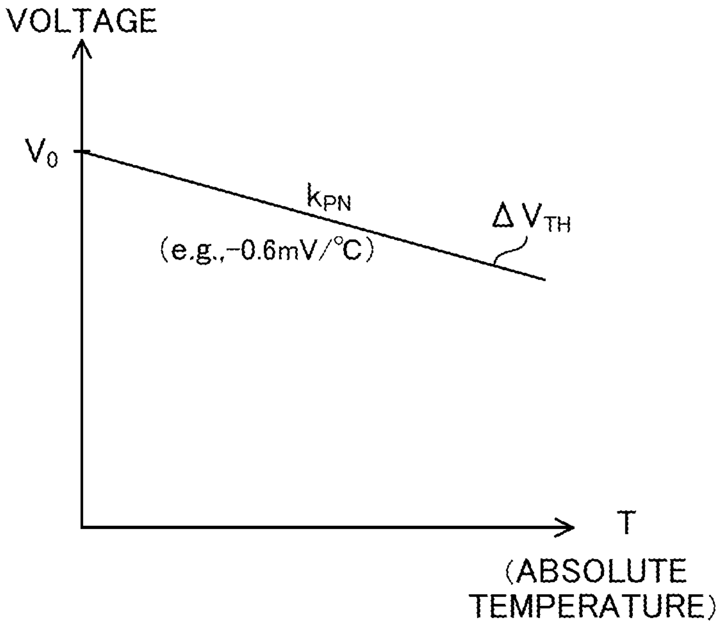
FIG. 7 is a diagram showing the temperature dependence of the voltage generated by a second voltage generation circuit according to the embodiment of the present disclosure.

FIG. 7 shows the relationship of the voltage $\Delta V_{TH}$ with the absolute temperature T. The voltage $\Delta V_{TH}$ fulfills Formula (2) below. In Formula (2), T represents the absolute temperature, $V_0$ represents the value of the voltage $\Delta V_{TH}$ at an absolute temperature T of 0 Kelvin, and $k_{PN}$ represents the temperature coefficient of the voltage $\Delta V_{TH}$. The temperature coefficient $k_{PN}$ of the voltage $\Delta V_{TH}$ represents the variation of the voltage $\Delta V_{TH}$ per rise of one degree in the absolute temperature T. For example, the voltage $V_0$ is 1.036 V (volts) and the temperature coefficient $k_{PN}$ is −0.6 mV/° C.

$$\Delta V_{TH}=V_0+k_{PN}\cdot T \tag{2}$$

Moreover, in the second voltage generation circuit 120, the transistors 121 and 122 operate in a subthreshold region. Specifically, the gate-source voltage of the transistor 121 is lower than the gate threshold voltage of the transistor 121, and subthreshold conduction permits the current In to pass between the drain and the source of the transistor 121; likewise, the gate-source voltage of the transistor 122 is lower than the gate threshold voltage of the transistor 122, and subthreshold conduction permits the current Ip to pass between the drain and the source of the transistor 122. Such operation in the subthreshold region can be achieved by appropriately setting the set voltage $V_{SET}$ as the target of the reference voltage $V_{REFOUT}$, the gate lengths and gate widths of the transistors in the second voltage generation circuit 120, etc. For example, the drain current through the transistor 123 is set to about 10 nA (nanoamperes) at normal temperature (25° C.).

The output adjustment circuit 130, which can be called an output stage circuit, boosts the sum voltage ($V_{T2}+\Delta V_{TH}$) at the node ND3 by a factor corresponding to the resistance value ratio between the resistors R3 and R4 so that the resulting voltage appears, as the reference voltage $V_{REFOUT}$, on the output voltage line LN2. The voltage generation circuits 110 and 120 operate by using as the supply voltage (driving voltage) for them the voltage on the output voltage line LN2. Thus, after the voltage generation circuits 110 and 120 have started up, the voltage generation circuits 110 and 120 operate by using as the supply voltage for them the reference voltage $V_{REFOUT}$ generated by the coordinated operation of the circuits 110, 120, and 130. Incidentally, before the voltage generation circuits 110 and 120 start up, a voltage based on a current supplied from the current source circuit 150 appears on the output line LN2, and based on this voltage the starting circuit 140 operates so that the voltage generation circuits 110 and 120 will start up.

Figure 8:
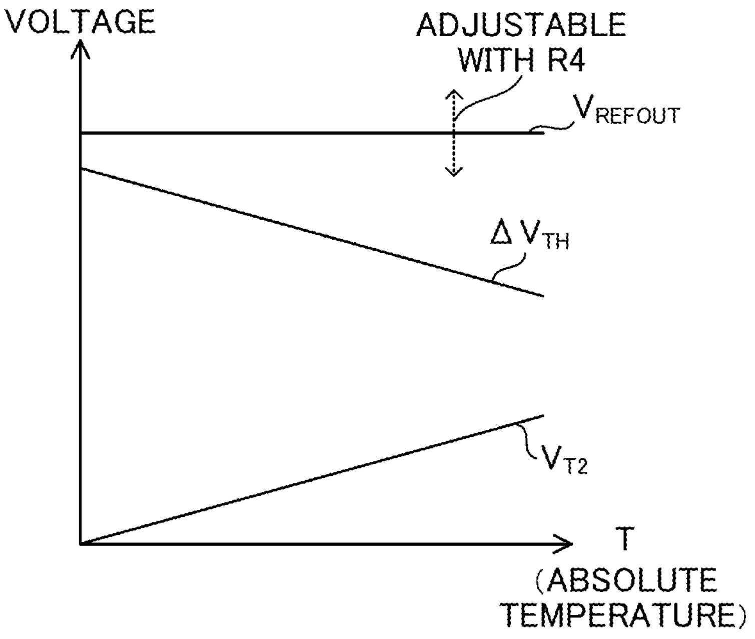
FIG. 8 is a diagram showing the temperature dependence of the voltages generated by the first and second voltage generation circuits and the temperature dependence of a reference voltage based on those voltages according to the embodiment of the present disclosure.

FIG. 8 shows the relationship of the voltages $V_{T2}$, $\Delta V_{TH}$, and $V_{REFOUT}$ with the absolute temperature T. The value of the resistor R2 can be adjusted such that the magnitude (absolute value) of the temperature coefficient $k_{VT2}$ of the voltage $V_{T2}$ is equal to the magnitude (absolute value) of the temperature coefficient $k_{PN}$ of the voltage $\Delta V_{TH}$. It is thus possible to keep the reference voltage $V_{REFOUT}$ constant over a wide temperature range (i.e., it is possible to give the reference voltage $V_{REFOUT}$ a temperature coefficient of zero).

Here, the resistor R4 is configured as a variable resistor, and thus the above-mentioned ratio (i.e., $V_{REFOUT}/(V_{T2}+\Delta V_{TH})$) used to generate the reference voltage $V_{REFOUT}$ from the sum voltage ($V_{T2}+\Delta V_{TH}$) is variable. Adjusting the value of the resistor R4 permits controlling the reference voltage $V_{REFOUT}$ to keep it accurately equal to the set voltage Vs ET against various kinds of variation. Here, the resistors R3 and R4 are matched so as to have the same temperature characteristics and thus the resistance value ratio between the resistors R3 and R4 can be regarded as constant against change in temperature. It is also possible to implement the resistor R4 as a fixed resistor and the resistor R3 as a variable resistor, in which case adjusting the value of resistor R3 permits adjusting the reference voltage $V_{REFOUT}$ It is possible instead to implement both of the resistors R3 and R4 as variable resistors. A variable resistor in the output adjustment circuit 130 functions as one for output adjustment. As the resistance value of the variable resistor for output adjustment varies, the above-mentioned ratio (i.e., $V_{REFOUT}/(V_{T2}+\Delta V_{TH})$) varies. It is here assumed that, of the resistors R3 and R4, only the resistor R4 is a variable resistor.

Figure 9:
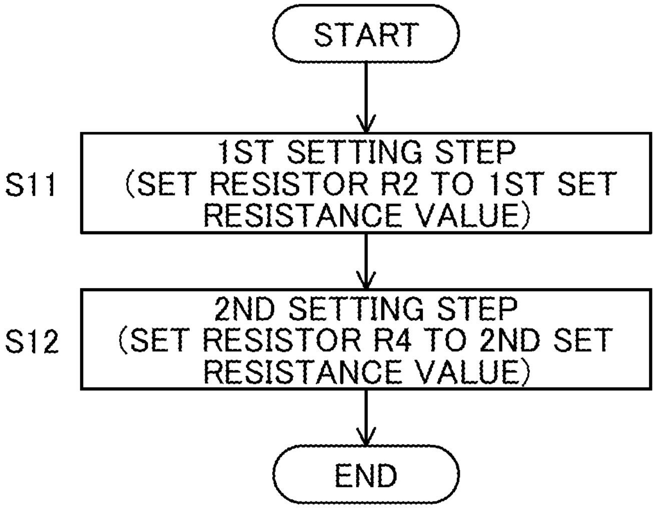
FIG. 9 is a flow chart of part of an inspection procedure for a semiconductor device according to the embodiment of the present disclosure.

Referring to FIG. 9, an inspection procedure that is performed before the shipment of the semiconductor device 1 includes a first setting step as Step S11 and a second setting step as Step S12. The resistor R2 is configured such that its value can be set to one of a plurality of first candidate resistance values. In the first setting step, a selection is made to determine which of the plurality of first candidate resistance values to set the value of the resistor R2 to. The selected first candidate resistance value will be referred to as the first set resistance value. The resistor R4 is configured such that its value can be set to one of a plurality of second candidate resistance values. In the second setting step, a selection is made to determine which of the plurality of second candidate resistance values to set the value of the resistor R4 to. The selected second candidate resistance value will be referred to as the second set resistance value. When the semiconductor device 1 having undergone the inspection procedure including the first and second setting steps starts up, the resistor R2 has the first set resistance value and the resistor R4 has the second set resistance value.

For example, in the inspection procedure for the semiconductor device 1, first setting data corresponding to the first set resistance value and second setting data corresponding to the second set resistance value are stored in a non-volatile memory (unillustrated) provided in the semiconductor device 1. When the semiconductor device 1 having undergone the inspection procedure starts up, the reference voltage generation circuit 10 can read the first and second setting data from the non-volatile memory and set the values of the resistors R2 and R4 to the first and second set resistance values respectively. Instead, in the inspection procedure for the semiconductor device 1, laser trimming (fuse cutting) can be performed to set the values of the resistors R2 and R4 to the first and second set resistance values respectively such that the values of the resistors R2 and R4 thereafter remain fixed.

In the first setting step, the first set resistance value is determined so as to make the magnitude of the temperature coefficient $k_{VT2}$ of the voltage $V_{T2}$ as close as possible to (if possible, exactly equal to) the magnitude of the temperature coefficient $k_{PN}$ of the voltage $\Delta V_{TH}$. That is, out of the plurality of first candidate resistance values, a first candidate resistance value that minimizes the difference between the magnitude of the temperature coefficient $k_{VT2}$ of the voltage $V_{T2}$ and the magnitude of the temperature coefficient $k_{PN}$ of the voltage $\Delta V_{TH}$ is selected as the first set resistance value.

In the second setting step, the second set resistance value is determined so as to make the reference voltage $V_{REFOUT}$ as close as possible to (if possible, exactly equal to) the predetermined set voltage $V_{SET}$ That is, out of the plurality of second candidate resistance values, a second candidate resistance value that minimizes the difference between the reference voltage $V_{REFOUT}$ and the set voltage $V_{SET}$ is selected as the second set resistance value.

The first and second setting steps can be performed in a predetermined calibration environment in which the ambient temperature around the semiconductor device 1 is about 25° C. Making zero the difference between the magnitude of the temperature coefficient $k_{VT2}$ and the magnitude of the temperature coefficient $k_{PN}$ in a predetermined calibration environment is expected to result in keeping that difference substantially zero over the entire operating temperature range of the semiconductor device 1.

The first setting step can be performed first and then the second setting step. In this case, the second setting step can be performed on the assumption that the resistor R2 has the first set resistance value. This however is not essential: the second setting step can be performed first and then the first setting step.

In the second voltage generation circuit 120, the difference in gate threshold voltage between two transistors 121 and 122 with the same structure (but with different gate conductivity types) is exploited to produce a voltage ($\Delta N_{TH}$) with desired temperature characteristics. Thus, some of the factors of variation ascribable to the vertical structure are canceled. The same applies to the first voltage generation circuit 110. The cancellation of factors of variation ascribable to the vertical structure results in reduced variation of the voltages $V_{T1}$, $V_{T2}$, and $\Delta V_{TH}$. Moreover, variation among individual semiconductor chips can be coped with by adjusting the temperature coefficient $k_{VT2}$ of the voltage $V_{T2}$ with the resistance value ratio between the resistors R1 and R2 and by absorbing the variation of the absolute value of the reference voltage $V_{REFOUT}$ with the resistance value ratio between the resistors R3 and R4. It is thus possible to generate an accurate reference voltage $V_{REFOUT}$ with little temperature variation over the entire operating temperature range of the semiconductor device 1. Specifically, it is possible to reduce the deviation of the reference voltage $V_{REFOUT}$ relative to the set voltage $V_{SET}$ (i.e., $|V_{REFOUT}-V_{SET}|/V_{SET}$) to about ±0.5% or less over the entire temperature range from −40° C. to 150° C. This is a great advantage compared with the deviation (±2%) that accompanies the configuration in FIG. 4. Generating the voltages $V_{T2}$ and $\Delta V_{TH}$ by using the accurate reference voltage $V_{REFOUT}$ as a supply voltage (driving voltage) also helps reduce the factors of variation.

Moreover, using the subthreshold region of MOSFETs when generating the voltages $V_{T2}$ and $\Delta V_{TH}$ helps reduce the total current consumption of the circuits that generate the voltages $V_{T2}$ and $\Delta V_{TH}$ to 1 μA or less (e.g., about 250 nA), resulting in high energy efficiency.

To follow is a description of some examples of modifications and the like in connection with the configuration and operation described above.

Figure 10:
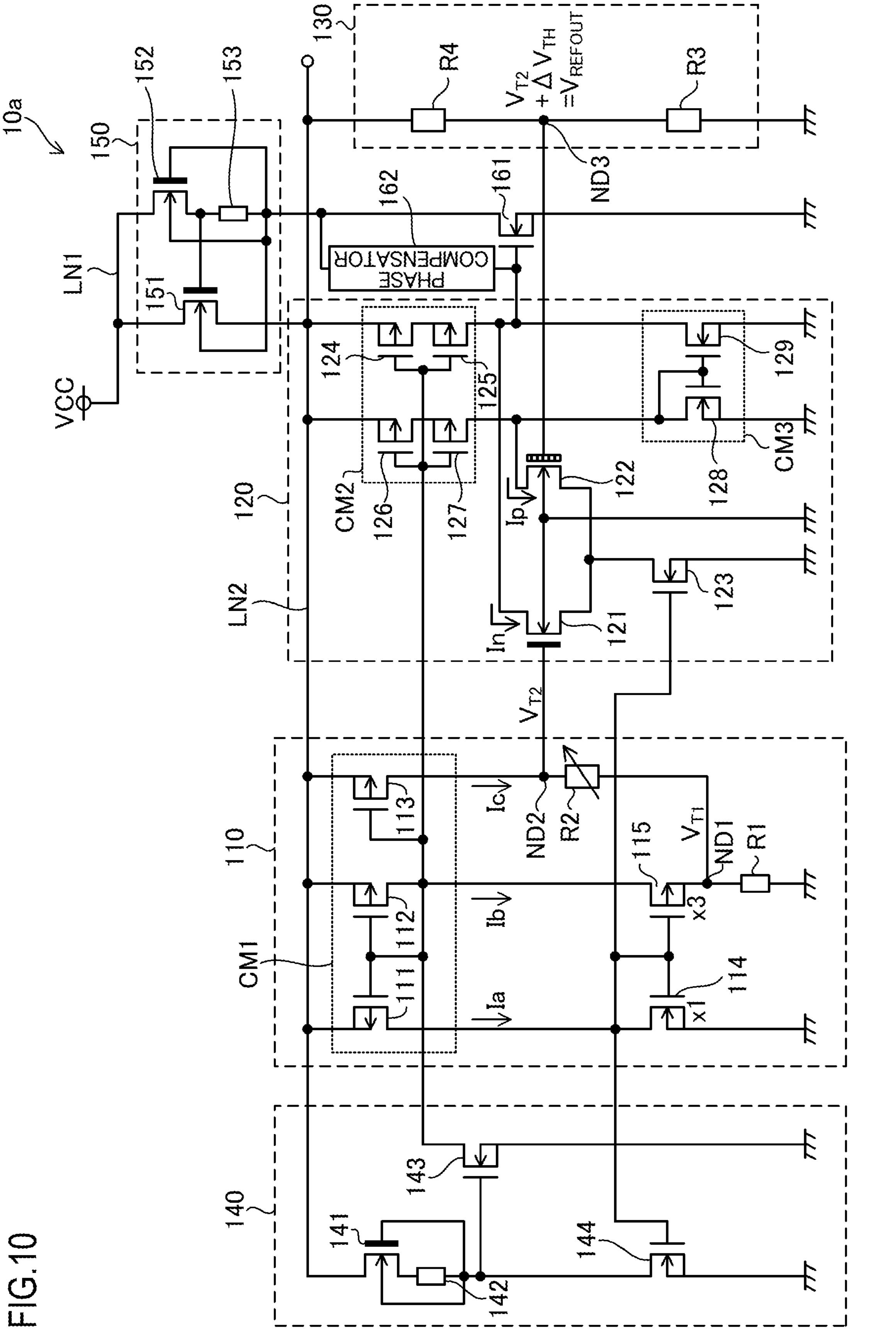
FIG. 10 is a modified configuration diagram of a reference voltage generation circuit according to the embodiment of the present disclosure.

The reference voltage generation circuit 10 in FIG. 5 can be modified to a reference voltage generation circuit 10*a* as shown in FIG. 10. In the reference voltage generation circuit 10*a* in FIG. 10, the voltage at the node ND3 is itself output as the reference voltage $V_{REFOUT}$. That is, in the reference voltage generation circuit 10*a*, $V_{REFOUT}=V_{T2}+\Delta V_{TH}$. In that a voltage proportional to the voltage ($V_{T2}+\Delta V_{TH}$) at the node ND3 is applied to the line LN2, the reference voltage generation circuit 10 and the reference voltage generation circuit 10*a* are the same. In the reference voltage generation circuit 10*a*, the resistor R4 can be a fixed resistor, and accordingly the second setting step can be omitted. In comparison with the reference voltage generation circuit 10 in FIG. 5, the reference voltage generation circuit 10*a* exhibits a larger deviation of the reference voltage $V_{REFOUT}$ relative to the set voltage $V_{SET}$, but even so an improvement is expected compared with the configuration in FIG. 4. Specifically, for example, though depending on the set voltage $V_{SET}$, in the reference voltage generation circuit 10*a* in FIG. 10, it is possible to reduce the deviation of the reference voltage $V_{REFOUT}$ relative to the set voltage $V_{SET}$ (i.e., $|V_{REFOUT}-V_{SET}|/V_{SET}$) to about ±1.5% or less over the entire temperature range from 40° C. to 150° C.

Various circuits are known as PTAT circuits that generate a PTAT voltage with positive temperature characteristics. Any PTAT circuit that generates and outputs a PTAT voltage can be employed as the first voltage generation circuit 110. In that case, the PTAT voltage is used as the voltage $V_{T2}$.

While the above description deals with an example where the transistor 121 (see FIG. 5) is configured as a depression MOSFET, the transistor 121 may instead be configured as an enhancement MOSFET. In that case, since the transistor 122 has the same structure as the transistor 121 except that the conductivity type of its gate is the P type, the transistor 122 too is an enhancement MOSFET. It should however be noted that implementing the transistor 121 as an enhancement type, as compared with implementing it as a depression type, requires that the voltage on the output voltage line LN2 be set higher. From a similar viewpoint, the starting circuit 140 can be modified such that the transistor 141 is configured with an enhancement MOSFET. The current source circuit 150 may be modified such that the transistors 151 and 152 are configured with enhancement MOSFETs.

The channel type of any FET (field-effect transistor) in the embodiment is merely illustrative. Any circuit including an FET can be modified such that an N-channel FET is replaced with a P-channel FET or that a P-channel FET is replaced with an N-channel FET.

Unless incompatible, any transistor mentioned above can be a transistor of any type. For example, unless incompatible, any transistor mentioned above as a MOSFET can be replaced with a junction FET, IGBT (insulated-gate bipolar transistor), or bipolar transistor. Any transistor has a first electrode, a second electrode, and a control electrode. In an FET, of the first and second electrodes one is the drain and the other is the source, and the control electrode is the gate. In an IGBT, of the first and second electrodes one is the collector and the other is the emitter, and the control electrode is the gate. In a bipolar transistor that is not classified as an IGBT, of the first and second electrodes one is the collector and the other is the emitter, and the control electrode is the base.

In the example dealt with above, a stabilized voltage generation circuit according to the present disclosure is employed to generate a reference voltage. In practice, there is no limitation on the use of a voltage (corresponding to $V_{REFOUT}$) generated by a stabilized voltage generation circuit according to the present disclosure.

In the present disclosure, whenever a first physical quantity and a second physical quantity are mentioned to be equal, that allows for an error. That is, whenever a first physical quantity and a second physical quantity are mentioned to be equal, it means that designing or manufacturing is done with an aim of making the first and second physical quantities equal; thus even if in reality there is an error between the first and second physical quantities, these are to be understood to be equal. This applies to anything other than physical quantities that are described with any term such as equal, identical, the same, or the like (e.g., a first structure and a second structure that are mentioned to be the same).

To follow are supplementary notes on a stabilized voltage generation circuit according to the present disclosure. According to one aspect of the present disclosure, a stabilized voltage generation circuit (10, 10*a*) includes: a first voltage generation circuit (110) that is configured to generate a first voltage ($V_{T2}$) with positive temperature characteristics; and a second voltage generation circuit (120) that includes a first MOSFET (121) having a gate of a first conductivity type and a second MOSFET (122) having a gate of a second conductivity type different from the first conductivity type and that is configured to generate a second voltage ($\Delta N_{TH}$) with negative temperature characteristics based on the difference in gate threshold voltage between the first and second MOSFETs. The stabilized voltage generation circuit generates an output voltage ($V_{REFOUT}$) based on the sum voltage ($V_{T2}+\Delta V_{TH}$) of the first and second voltages. (A first configuration.)

In the stabilized voltage generation circuit of the first configuration described above, the stabilized voltage generation circuit may generate as the output voltage a voltage resulting from boosting the sum voltage by a variable factor. (A second configuration.)

The stabilized voltage generation circuit of the second configuration described above may further include: an output adjustment circuit that includes a series circuit of a plurality of resistors provided between an output voltage line to which the output voltage is applied and a ground. The sum voltage may be applied to a connection node between the plurality of resistors. The plurality of resistors may include a variable resistor for output adjustment, and the factor may vary as the resistance value of the variable resistor for output adjustment is varied. (A third configuration.)

In the stabilized voltage generation circuit of the third configuration described above, the first and second voltage generation circuits may operate by using as a supply voltage the voltage on the output voltage line. (A fourth configuration.)

In the stabilized voltage generation circuit of any of the first to fourth configurations described above, in the second voltage generation circuit, the sources of the first and second MOSFETs may be connected together, and the difference between the gate potential of the first MOSFET and the gate potential of the second MOSFET with currents of equal magnitudes fed to the first and second MOSFETs may be generated as the second voltage. (A fifth configuration.)

In the stabilized voltage generation circuit of the fifth configuration described above, the gate of the first MOSFET may be fed with the first voltage, and the sum voltage may appear at the gate of the second MOSFET. (A sixth configuration.)

In the stabilized voltage generation circuit of any of the first to sixth configurations described above, the first voltage generation circuit may generate the first voltage by using two MOSFETs operating with different current densities. (A seventh configuration.)

In the stabilized voltage generation circuit of the seventh configuration described above, the first voltage generation circuit may be configured to be capable of adjusting the temperature coefficient of the first voltage by using a variable resistor for temperature coefficient adjustment. (An eighth configuration.)

In the stabilized voltage generation circuit of the seventh or eighth configuration described above, the two MOSFETs may operate in a subthreshold region. (A ninth configuration.)

In the stabilized voltage generation circuit of any of the first to ninth configurations described above, the first and second MOSFETs may operate in a subthreshold region. (A tenth configuration.)

According to another aspect of the present disclosure, a semiconductor device includes: a stabilized voltage generation circuit according to any of the first to tenth configurations described above; and a functional circuit configured to perform predetermined operation by using as a reference voltage the output voltage generated by the stabilized voltage generation circuit. (An eleventh configuration.)

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the subject matter of the present disclosure and its constituent elements is not limited to that mentioned in connection with the embodiments. The specific values mentioned in the above description are merely illustrative and needless to say can be modified to different values.

The invention claimed is:

1. A stabilized voltage generation circuit comprising:

a first voltage generation circuit configured to generate a first voltage with positive temperature characteristics; and a second voltage generation circuit including a first MOSFET having a gate of a first conductivity type, and a second MOSFET having a gate of a second conductivity type different from the first conductivity type, wherein the second voltage generation circuit is configured to generate a second voltage with negative temperature characteristics based on a difference in gate threshold voltage between the first and second MOSFETs, and the stabilized voltage generation circuit is configured to generate an output voltage based on boosting a sum voltage of the first and second voltages by a variable factor; and an output adjustment circuit including a series circuit of a plurality of resistors provided between an output voltage line to which the output voltage is applied and a ground, wherein the sum voltage is applied to a connection node between the plurality of resistors, the plurality of resistors include a variable resistor for output adjustment, and the factor varies as a resistance value of the variable resistor for output adjustment is varied.

2. The stabilized voltage generation circuit according to claim 1, wherein the first and second voltage generation circuits operate by using as a supply voltage the voltage on the output voltage line.

3. The stabilized voltage generation circuit according to claim 1, wherein in the second voltage generation circuit, sources of the first and second MOSFETs are connected together, and a difference between a gate potential of the first MOSFET and a gate potential of the second MOSFET with currents of equal magnitudes fed to the first and second MOSFETs is generated as the second voltage.

4. The stabilized voltage generation circuit according to claim 3, wherein a gate of the first MOSFET is fed with the first voltage, and the sum voltage appears at a gate of the second MOSFET.

5. The stabilized voltage generation circuit according to claim 1, wherein the first and second MOSFETs operate in a subthreshold region.

6. A semiconductor device, comprising:

a stabilized voltage generation circuit according to claim 1, and a functional circuit configured to perform predetermined operation by using as a reference voltage the output voltage generated by the stabilized voltage generation circuit.

7. A stabilized voltage generation circuit comprising:

a first voltage generation circuit configured to generate a first voltage with positive temperature characteristics; and a second voltage generation circuit including a first MOSFET having a gate of a first conductivity type, and a second MOSFET having a gate of a second conductivity type different from the first conductivity type, wherein the second voltage generation circuit is configured to generate a second voltage with negative temperature characteristics based on a difference in gate threshold voltage between the first and second MOSFETs, the stabilized voltage generation circuit generates an output voltage based on a sum voltage of the first and second voltages, the first voltage generation circuit generates the first voltage by using two MOSFETs operating with different current densities, and the first voltage generation circuit is configured to be capable of adjusting a temperature coefficient of the first voltage by using a variable resistor for temperature coefficient adjustment.

8. The stabilized voltage generation circuit according to claim 7, wherein the two MOSFETs operate in a subthreshold region.

9. A stabilized voltage generation circuit, comprising:

a first voltage generation circuit configured to generate a first voltage with positive temperature characteristics;

a second voltage generation circuit including a first MOSFET having a gate of a first conductivity type, and a second MOSFET having a gate of a second conductivity type different from the first conductivity type, wherein the second voltage generation circuit is configured to generate a second voltage with negative temperature characteristics based on a difference in gate threshold voltage between the first and second MOSFETs;

a starting circuit; and a current source circuit configured to supply the starting circuit with a current corresponding to an internal supply voltage, wherein the stabilized voltage generation circuit is configured to generate an output voltage based on a sum voltage of the first and second voltages, and the starting circuit is configured to start the first and second voltage generation circuits based on a starting voltage corresponding to the current.

10. The stabilized voltage generation circuit according to claim 9, wherein the stabilized voltage generation circuit is configured to generate as the output voltage a voltage resulting from boosting the sum voltage by a variable factor.

11. The stabilized voltage generation circuit according to claim 10, further comprising:

an output adjustment circuit including a series circuit of a plurality of resistors provided between an output voltage line to which the output voltage is applied and a ground, wherein the sum voltage is applied to a connection node between the plurality of resistors, the plurality of resistors include a variable resistor for output adjustment, and the factor varies as a resistance value of the variable resistor for output adjustment is varied.

12. The stabilized voltage generation circuit according to claim 11, wherein the first and second voltage generation circuits operate by using as a supply voltage the voltage on the output voltage line.

* * * * *